(12) United States Patent
Bui et al.

(10) Patent No.: US 8,694,355 B2
(45) Date of Patent: Apr. 8, 2014

(54) METHOD AND APPARATUS FOR AUTOMATED ASSISTANCE WITH TASK MANAGEMENT

(75) Inventors: Hung Bui, Mountain View, CA (US); Steven Eker, East Palo Alto, CA (US); Daniel Elenius, San Mateo, CA (US); Melinda Gervasio, Mountain View, CA (US); Thomas J. Lee, San Francisco, CA (US); Mei Marker, Santa Clara, CA (US); David Morley, Camberwell (AU); Janet Murdock, Mountain View, CA (US); Karen Myers, Menlo Park, CA (US); Bart Peintner, Palo Alto, CA (US); Shahin Saadati, Santa Clara, CA (US); Eric Yeh, Alameda, CA (US); Neil Yorke-Smith, Mountain View, CA (US)

(73) Assignee: SRI International, Menlo Park, CA (US)

( * ) Notice: Subject to any disclaimer, the term of this patent is extended or adjusted under 35 U.S.C. 154(b) by 546 days.

(21) Appl. No.: 12/476,020

(22) Filed: Jun. 1, 2009

(65) Prior Publication Data

US 2009/0307162 A1 Dec. 10, 2009

Related U.S. Application Data

(60) Provisional application No. 61/057,754, filed on May 30, 2008, provisional application No. 61/144,117, filed on Jan. 12, 2009, provisional application No. 61/144,399, filed on Jan. 13, 2009.

(51) Int. Cl.
*G06Q 10/00* (2012.01)

(52) U.S. Cl.
USPC ............................................................ 705/7.27

(58) Field of Classification Search
USPC ............................................................ 705/7.27
See application file for complete search history.

(56) References Cited

U.S. PATENT DOCUMENTS

| | | | | |
|---|---|---|---|---|
| 5,734,837 A | * | 3/1998 | Flores et al. | 705/7.13 |
| 6,003,011 A | * | 12/1999 | Sarin et al. | 705/7.26 |
| 7,676,294 B2 | * | 3/2010 | Baier et al. | 700/108 |
| 7,698,316 B2 | * | 4/2010 | Song et al. | 707/608 |
| 7,761,885 B2 | * | 7/2010 | Labrou et al. | 719/330 |
| 7,898,696 B2 | * | 3/2011 | Marchesotti et al. | 358/3.27 |
| 2002/0188644 A1 | * | 12/2002 | Seidman | 709/100 |

(Continued)

OTHER PUBLICATIONS

Peintner, Bart; Dinger, Jason; Rodriguez, Andres; Myers, Karen. Task Assistant: Personalized Task Management for Military Environments. SRI International. 2009.*

*Primary Examiner* — Johnna Loftis

(57) ABSTRACT

The present invention relates to a method and apparatus for assisting with automated task management. In one embodiment, an apparatus for assisting a user in the execution of a task, where the task includes one or more workflows required to accomplish a goal defined by the user, includes a task learner for creating new workflows from user demonstrations, a workflow tracker for identifying and tracking the progress of a current workflow executing on a machine used by the user, a task assistance processor coupled to the workflow tracker, for generating a suggestion based on the progress of the current workflow, and a task executor coupled to the task assistance processor, for manipulating an application on the machine used by the user to carry out the suggestion.

26 Claims, 8 Drawing Sheets

(56) References Cited

U.S. PATENT DOCUMENTS

| | | | |
|---|---|---|---|
| 2004/0148178 A1* | 7/2004 | Brain, II | 705/1 |
| 2005/0246726 A1* | 11/2005 | Labrou et al. | 719/328 |
| 2009/0024440 A1* | 1/2009 | Spahn | 705/9 |
| 2009/0088875 A1* | 4/2009 | Baier et al. | 700/83 |
| 2009/0240539 A1* | 9/2009 | Slawson et al. | 705/7 |

* cited by examiner

TASK LEARNER QUESTIONS CATALOG

| QUESTION CATEGORY | SAMPLE QUESTIONS |
|---|---|
| Workflow Function and Causality | − Which action(s) does Action A/Effect E enable?<br>− Which precondition(s) does Action A/Effect E enable?<br>− Which action(s) does Action A/Effect E depend on?<br>− Which effect(s) does Action A/Effect E depend on?<br>− Do Action Parameters P1 and P2 have to be the same value?<br>− Does Action Parameter P1 determine Action Parameter P2?<br>− How does Action Parameter P1 determine Action Parameter P2?<br>− What parameters does Action Parameter P1 determine?<br>− Which of Action Parameters {P1, P2, ..., Pn} determines Action Parameter Pi?<br>− Which of Action Parameters {P1, P2, ..., Pn} does Action Parameter Pi determine?<br>− Is Action Parameter P1 an input/output to the demonstration?<br>− Must Action A precede Action B?<br>− Must Action A immediately precede Action A+1?<br>− Is it desirable/why is it desirable for Action A to precede Action B?<br>− What is the role of Action in the plan? |
| Decision Alternatives and justifications | − Could Action A be used as an alternative to Action B?<br>− What actions other than Action A could be used?<br>− What factors affected the choice of Action A?<br>− Why was Action A used rather than Action B (e.g., speed, quality)?<br>− Could Action Parameter P1 be used as an alternative to Action Parameter P2 in Action A?<br>− What values other than Action Parameter P1 could be used in Action A?<br>− What factors affected the choice of Action Parameter P1?<br>− Why was Action Parameter P1 used rather than Action Parameter P2 (e.g., speed, quality)?<br>− Can Action Parameter P1 and Action Parameter P2 be the same values?<br>− Can Action Parameter P1 and Action Parameter P2 be different values? |
| Limitations and Failure | − Under what conditions does this demonstration work?<br>− Under what conditions would Action A case problems?<br>− Under what conditions would Action A be undesirable?<br>− Under what conditions would the choice of Action Parameter P1 for Action A cause problems?<br>− Under what conditions would the choice of Action Parameter P1 for Action A be undesirable?<br>− Would this demonstration work if Condition C did not hold?<br>− What changes to the world state would cause this demonstration to fail?<br>− Where should conditional branches be introduced in the workflow? |

FIG. 4A

| QUESTION CATEGORY | SAMPLE QUESTIONS |
|---|---|
| Limitations and Failure | – Why did the execution of Action fail?<br>– Which actions/effects contributed to the failure of Action A?<br>– How could the failure of Action A be prevented? |
| Requests for Demonstration | – Show how to achieve Effect E.<br>– Show an alternative way to achieve Effect E.<br>– Show how to achieve Effect E under Condition C.<br>– Show how to handle a new problem.<br>– Show how to handle the current problem for the initial state {Condition C1, ..., Condition Cm}. |
| Abstraction | – Is there a preferred order for processing elements in the iteration domain?<br>– What is the preferred order for processing elements in the iteration domain?<br>– What defines the domain of iteration for Actions A1 through A1+n?<br>– Do actions (or action sequences) A1 and A2 have the same goal?<br>– Which actions (or action sequences) in the demonstration have the same goal?<br>– Which higher-level actions could Action A contribute to?<br>– Which actions in the demonstration contribute to higher-level Action A?<br>– Should {Action A1, Action A1+1, ..., Action A1+n} be generalized into a method?<br>– What outputs should Method M have? |
| Meta-questions | – Is there a preference function to determine the choice of Action A/Action Parameter P in Action A?<br>– Which attributes are relevant to the preference function to determine the choice of Action A/Action Parameter P in Action A?<br>– Given a set of conflicting hypotheses, which should be evaluated first?<br>– There is no identifiable dataflow or precondition/effect relations that necessitate the ordering of actions in the demonstration: should an experiment be run to determine ordering constraints? |

FIG. 4B

METHOD AND APPARATUS FOR AUTOMATED ASSISTANCE WITH TASK MANAGEMENT

CROSS REFERENCE TO RELATED APPLICATIONS

This application claims the benefit of U.S. Provisional Patent Application No. 61/057,754, filed May 30, 2008; U.S. Provisional Patent Application No. 61/144,117, filed Jan. 12, 2009; and U.S. Provisional Patent Application No. 61/144,399, filed Jan. 13, 2009, all of which are herein incorporated by reference in their entireties.

REFERENCE TO GOVERNMENT FUNDING

This application was made with Government support under contract nos. FA8650-06-C-7606 and FA8750-07-D-0185 awarded by the United States Air Force, and contract no. NBCHD030010 awarded by the Department of Interior. The Government has certain rights in this invention.

FIELD OF THE INVENTION

The present invention relates generally to task management, and relates more particularly to technology for assisting in task management.

BACKGROUND OF THE INVENTION

Ethnographic studies of human work habits and task management reveal that people usually achieve all of their important tasks. People become adept at multi-tasking and remembering what really matters; however, they fail to perfectly achieve tasks with soft deadlines or to remember less critical details. It is in these areas where assistance technology can provide the greatest utility.

In order to be effective, assistance technology requires the ability to act appropriately according to context. One aspect of context in this setting is the user's current activity within the larger scope of his or her current and future tasks. The assistance technology must be able to understand what the user is working on in the present and what goals the current activities are directed towards. Thus, in order to assist the user in a meaningful way, the assistance technology must understand the user's goals and the means by which the assistance technology and the user can achieve these goals by working together.

SUMMARY OF THE INVENTION

The present invention relates to a method and apparatus for assisting with automated task management. In one embodiment, an apparatus for assisting a user in the execution of a task, where the task includes one or more workflows required to accomplish a goal defined by the user, includes a task learner for creating new workflows from user demonstrations, a workflow tracker for identifying and tracking the progress of a current workflow executing on a machine used by the user, a task assistance processor coupled to the workflow tracker, for generating a suggestion based on the progress of the current workflow, and a task executor coupled to the task assistance processor, for manipulating an application on the machine used by the user to carry out the suggestion.

BRIEF DESCRIPTION OF THE DRAWINGS

The teachings of the present invention can be readily understood by considering the following detailed description in conjunction with the accompanying drawings, in which:

FIGS. 4A-4B illustrate a table containing a plurality of exemplary questions falling into each of these categories;

To facilitate understanding, identical reference numerals have been used, where possible, to designate identical elements that are common to the figures.

DETAILED DESCRIPTION

The present invention relates to a method and apparatus for assistance with automated task management. Within the context of the present invention, the term "task management" refers broadly to the planning, execution, and oversight of tasks associated with a specific user goal or goals. Embodiments of the invention adaptively assist a user or team of users in the management of individual and shared tasks. The individual and shared tasks may be part of a larger collaborative exercise that comprises multiple smaller tasks. In turn, each task is made up of one or more workflows (i.e., partially-ordered sets of steps required to accomplish goals), where the workflows model patterns of user behavior in the achievement of a user goal. These goals are explicitly defined and represented such that a system according to the present invention can reason about and manipulate them. In some embodiments, one or more of these goals are user-defined.

For example, if a task comprises the review of a journal paper that has been emailed to the user, the workflow associated with this task might include the following steps: (1) the user downloads the paper and the review form that are attached to the email; (2) the user prints the paper and fills out the review form; and (3) the user sends the review form back to the requester as a reply to the original email.

One embodiment of the present task management system comprises a modular framework that encompasses a plurality of functionalities, including, but not limited to: the ability to offer suggestions to a user (e.g., based on models derived from user actions and feedback), the ability to direct or perform execution of tasks, the ability to recognize and follow user activities, and the ability to learn workflows by demonstration.

Figure 1:
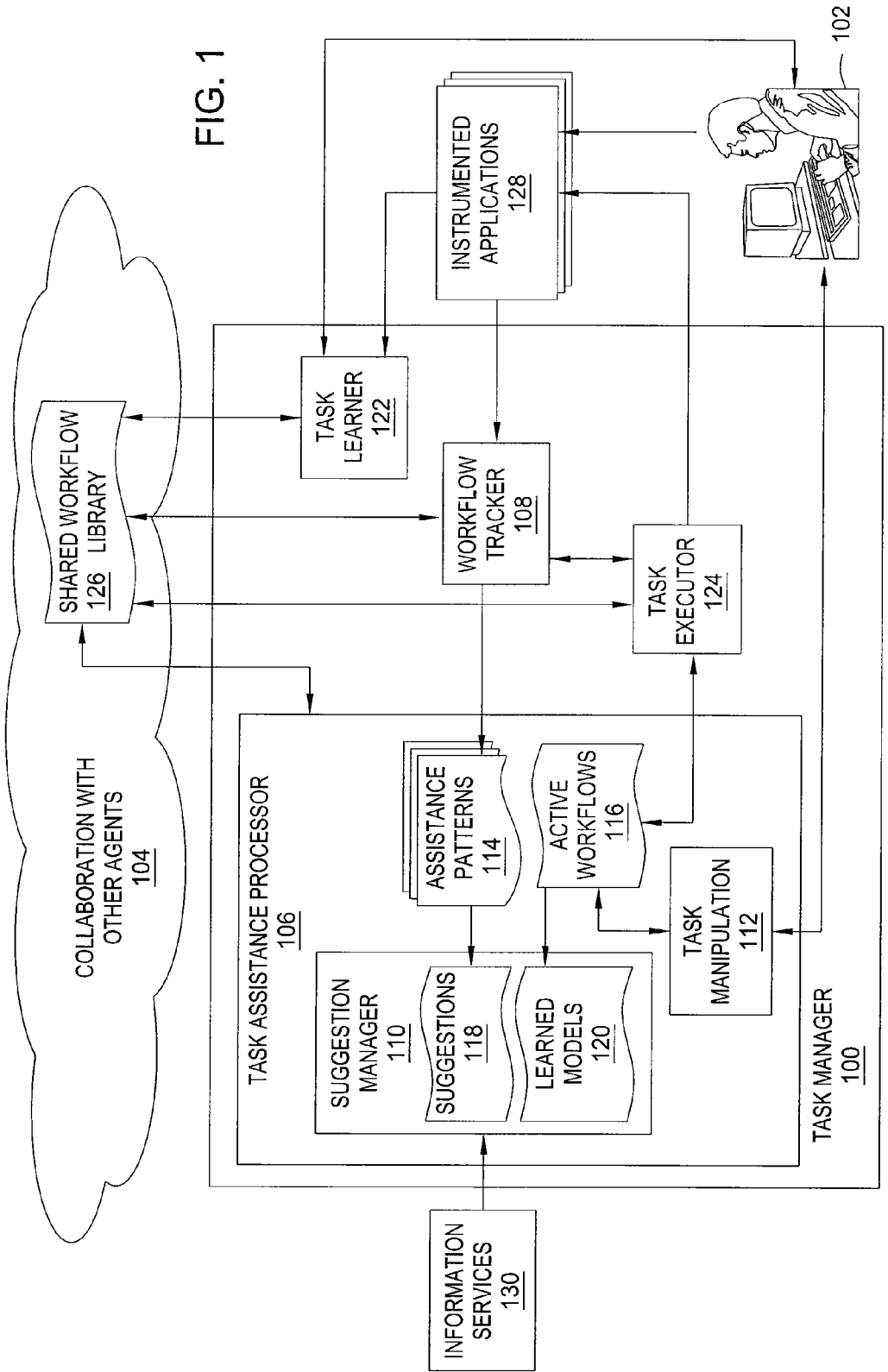
FIG. 1 is a block diagram illustrating one embodiment of a task manager, according to the present invention.

FIG. 1 is a block diagram illustrating one embodiment of a task manager 100, according to the present invention. The task manager 100 is configured to assist a user 102 or group of users with the management of individual and/or shared tasks in an automated, adaptive manner. As described in further detail below, the task manager 100 decides, within the context of a task, what to do given the rich multitude of state and environmental information available (including estimates of workflow states and parameters), when to do it, and how to do it. Thus, the task manager 100 embodies a proactive ability to anticipate user needs, opportunities, and problems, and to act on its own initiative to address those needs, opportunities, and problems.

As illustrated, the task manager 100 is substantially modular in configuration and comprises four major components: a task assistance processor 106, a task learner 122, a workflow tracker 108, and a task executor 124. The task assistance processor 106, the workflow tracker 108, and the task executor 124 are in direct communication with each other, while the task learner 122 is in direct communication with the user 102 and with a shared workflow library 126 that is shared by the user 102 and other task managers or agents 104 with whom the user 102 cooperates on the collaborative exercise.

The workflow tracker 108 performs workflow recognition and tracking with respect to active workflows currently being executed by the user 102. Specifically, the workflow tracker 108 receives input data from instrumented applications 128 running on the user's machine (e.g., email, word processing, web browsing, and the like), processes this data to recognize activities occurring on the user's machine, and outputs contextual information about the active workflow currently being executed by the user 102.

The input data from the instrumented applications 128 comprises data related to observable events on the user's machine (i.e., captured and logged data relating to user-performed actions, such as sending an email or renaming a desktop folder). In one embodiment, this data represents actions corresponding to application-level user operations (as opposed to, for example, state changes). This enables the actions to be represented as the user 102 would tend to think of them while using an application. For example, users typically think of opening and closing documents, reading and sending emails, and filling in form fields rather than pulling down menus and clicking on menu items or typing individual characters.

Processing of this data involves identifying whether the stream of interaction data embodied in the input data matches any task models in the shared workflow library 126, where each of these task models represents a task and its corresponding automated workflows. If there is a match, the workflow tracker 108 will track the progress of the active workflow in accordance with the stored workflow of the matching task model in the shared workflow library 126. In other words, the workflow tracker 108 will match a step of the matching task model to a current step of the active workflow, and then follow the current workflow in accordance with the series of steps encoded in the matching task model. Thus, the workflow tracker 108 automatically identifies workflows, as well as the user's current step in a given workflow, without requiring the user 102 to explicitly indicate commencement and completion of every step of a workflow.

In the computer desktop domain, steps in a workflow are often associated with a particular desktop object such as an email, a file, or a uniform resource locator (URL). Such an object is considered to be a parameter for the associated step (e.g., OpenDocument('review.doc')). In one embodiment, the workflow tracker 108 uses a Logical Hidden Markov Model (HMM) as its representation of the workflow in order to accommodate such workflow parameters. A Logical HMM extends the HMM state to take the form of a ground atom in a first-order language. State transitions can be written in the form of logical rules, such as "OpenDocument(X)→EditDocument(X):0.8." In this example, the variable X ranges over the set of documents in a system, and 0.8 represents the transition probability. Similarly, the corresponding observation model is "OpenDocument(x)→WordOpenEvent(X): 1.0."

In order to model irrelevant activities between workflow steps (e.g., the user 102 reads some other emails), a special "Background" state is included in the model that can generate substantially any observable event uniformly. Workflow recognition can then be viewed formally as a filtering problem on the Logical HMM representing the workflow. In one embodiment, a particle filter approach is implemented to minimize the costs of exact inference. Given a stream of user interaction events from the instrumented applications 128, the workflow tracker 108 returns a distribution over the possible steps in the workflow (including the "Background" state). Thus, the workflow tracker 108 identifies the most likely step and the most likely parameter values for the step.

Referring back to FIG. 1, the contextual information output by the workflow tracker 108 is used by the task assistance processor 106 (and more specifically by the suggestion manager 110 of the task assistance processor 106, as described in further detail below) to provide contextual suggestions to the user 102. In particular, the contextual information identifies the task model in the shared workflow library 126 that matches the active workflow, as well as optionally the current step of the active workflow within the context of the matching task model.

The task learner 122 also receives data from the instrumented applications 128. The task learner 122 processes this data to learn workflows specific to the observable events embodied in the input data. In one embodiment, the task learner 122 learns over at least one demonstration of a task or workflow. Thus, workflows can be learned from a single user demonstration or from multiple user demonstrations. These demonstrations may comprise linear or iterative sequences of actions. Iterations may be performed over lists and sets of data values, and may involve parallel iterations over lists. Thus, workflows learned by the task learner 122 can include iterations that generate lists or sets of values required by subsequent workflow actions or as outputs from a workflow.

In particular, the task learner 122 learns workflows by drawing on inference methods that identify dataflow completions from ambiguous user demonstrations, leading to compact and contextualized workflows that will assist in a wide range of situations. One embodiment of a method for learning by completing dataflows is discussed in further detail below with respect to FIG. 3.

In particular, the task learner 122 is able to infer connections between dataflow completions and to identify relationships among parameters of the dataflow completions. The task learner 122 looks for implicit rationales as to why certain actions are taken by the user 102 (e.g., why did the user 102 email a certain person, or why did the user 102 name a file a certain name?), thereby learning relationships between the user 102 and other people, projects, tasks, and the like. For example, the task learner 122 may learn, through observation of the user's actions, that the user 102 has a corporate (e.g., managerial or employer/employee) relationship with a person who the user 102 frequently emails. In one embodiment, at least half of the data that allows inference of such relationships comes from the instrumented applications 128. In a further embodiment, the task learner 122 learns loops (i.e., repeated sets of steps) over collections of objects (e.g., renaming folders on a computer desktop). These loops can be learned over one unordered collection of objects (e.g., a single set) or over one or more ordered collections of objects (e.g., multiple lists) in parallel. The output of such a loop is zero or more ordered collections of objects.

In a further embodiment, the task learner 122 additionally learns through mixed-initiative or active learning. In this case, the task learner 122 operates on data provided directly by the user 102. Information learned from this data serves to enhance the information learned from the instrumented applications 128. For instance, user-provided data may comprise user-defined aggregations of sub-tasks into higher-level tasks. In another embodiment, the task learner 122 poses questions to the user 102 in order to clarify inferences made from the data provided by the instrumented applications 128 (e.g., in order to clarify what the user 102 is doing). In one embodiment, these questions balance cost and utility models to enable focused questioning of the user and improve the results of the learning processes. For example, the cost assigned to a question may reflect how difficult it is for the user 102 to answer the question, while the benefit is associated with the answer.

In one embodiment, the task learner 122 poses questions to the user in an asynchronous manner. In this case, questions may be posed continuously during the learning process. In an alternative embodiment, the task learner 122 poses questions to the user in a synchronous manner. In this case, questions may be posed only at fixed points in the learning process (e.g., at the end of the learning process). A budget is imposed on question asking to restrict access to the user.

In one embodiment, the task learner 122 comprises multiple learning components, where each learning component learns aspects of a workflow in different ways.

The output of the task learner 122 is provided to the shared workflow library 126. In particular, the task learner 122 populates the shared workflow library 126 with task models that represent tasks and corresponding automated or mixed-initiative (i.e., not fully automated) workflows. As discussed above, these task models are used by the workflow tracker 108 in order to recognize and track the active workflow. In one embodiment, each task model in the shared workflow library 126 comprises a dual declarative/procedural representation. Declaratively, a task model describes the workflows that the user 102, the task manager 100, or other agents 104 execute to fulfill a goal. In addition, the task model describes the constraints between these workflows (e.g., ordering of workflows). Procedurally, a task model provides a "recipe" that the task manager 100 can instantiate into a plan to achieve a given workflow. Thus, each task model in the shared workflow library 126 encodes the steps that can be followed to accomplish a particular task, where each step is annotated to indicate which components of the task manager 100 may be permitted to perform it. Task models in the shared workflow library may represent tasks that are executable only by the user 102, only by the task manager 100, or by both the user 102 and the task manager 100 working together.

Thus, the output of the task learner 122 supports automated and/or mixed-initiative workflows, via population of the shared workflow library 126. The output of the task learner 122 also supports the task assistance processor 106, which retrieves data from the shared workflow library 126 to assist in making suggestions.

The task assistance processor 106 is configured to create, view, modify, share, and manipulate tasks and the workflows required to accomplish the tasks. In addition, the task assistance processor 106 associates tasks with the required workflows. To this end, the task assistance processor 106 comprises a suggestion manager 110, a task manipulation processor 112, a set of assistance patterns 114, and a set of active workflows 116.

The suggestion manager 110 is configured to deliberate over whether and how to proactively act within the context of a task. To this end, the suggestion manager 110 performs contextual (i.e., what the user 102 is currently doing) reasoning over tasks, as informed by the active workflows 116. Knowledge of user progress with respect to the active workflows 116 (e.g., the steps of the active workflows on which the user 102 is currently working) enables the suggestion manager 110 to volunteer information and suggestions (e.g., related documents, emails, URLs) specifically chosen for the current context, to provide a summary of progress (e.g., "waiting on Alice to complete step N"), and to take action (e.g., offer to perform the next step of the workflow, or to prepare for future steps).

At least some of this contextual information is provided by the workflow tracker 108, which as described above identifies a task model in the shared workflow library 126 that corresponds to the active workflow (and in some embodiments the current step of the workflow relative to the matching task model). In addition, the suggestion manager 110 makes use of the set of assistance patterns 114, which are specialized meta-level task models that describe proactive actions that may be taken by the task manager 100. These actions may include, for example, executing the next step of a workflow, reminding the user 102 of a forthcoming appointment, or suggesting that a task be delegated to another agent 104.

The assistance patterns 114 are generic (i.e., applicable in substantially any circumstance within the domain of the task manager 100) and represent a compiled form of reasoning about how to assist with task management (e.g., whether to take initiative and what to do). In a further embodiment, one or more of the assistance patterns 114 are specialized to given contexts. Thus assistance patterns 114 bridge the gap between a higher-level desire to assist the user 102 and lower-level, concrete actions that can actually be taken to assist the user 102.

In one embodiment, each assistance pattern 114 is defined in terms of a set of trigger conditions that, when satisfied, identify one or more potential goals to be considered by the suggestion manager 110. These trigger conditions are defined in terms of beliefs about the user's mental state (e.g., goals, focus of attention), the task manager's state, and the world state.

The suggestion manager 110 uses this contextual information to generate suggestions within the context of task management (e.g., to whom tasks should be delegated, which workflows might help in the performance of individual tasks, which previously created task lists expand upon a given task, and the like). In particular, the suggestion manager 110 reasons over assistance patterns 114 that are triggered by the current context (including user state and activity).

The suggestion manager 110 is adaptive such that the suggestions it makes evolve over time based on user feedback (e.g., stated user interaction preferences). These suggestions are informed by a set of suggestions 118 and a set of learned models 120 that are maintained by the suggestion manager 110. The suggestion manager 110 derives the suggestions 118 from the set of assistance patterns 114 and derives the learned models 120 from the set of active workflows 116. The suggestions 118 comprise templatized recommendations that may be made based on properties of observed workflows and on external information services 130, while the learned models 120 model relationships between people, tasks, workflows, and the current context of the user's activities. In one embodiment, the suggestion manager makes suggestions based on the properties of tasks, rather than on the tasks themselves.

As further illustrated, the task manager 100 has access to the shared workflow library 126, which saves workflows that have been executed previously. The suggestion manager 110 of the task assistance processor 106 uses this information to make suggestions regarding attachments (i.e., associations of procedures, people to delegate to, other workflows, subtasks, or the like) to tasks.

In one embodiment, the suggestion manager 110 bases its suggestions on a plurality of considerations, including, but not limited to, considerations of when it is appropriate to make a suggestion, what suggestions to make, and how to make the suggestions. Reasoning about such considerations is inherently meta-level; in addition to requiring deliberation over a model of the user's state and intentions, it further requires that the suggestion manager 110 reason about its capacity to perform potentially helpful tasks given its current commitments and capabilities. For example, based on these considerations, the suggestion manager 110 may automatically take action, or alternatively may ask the user 102 if action should be taken (e.g., click to approve this action, select one of the following actions, etc.). In addition, the suggestion manager 110 may make such suggestions using any one or more of a plurality of modalities (e.g., text, audio, video, or the like). The timing and/or modality of suggestions made by the suggestion manager 110 is determined by reasoning methods that adapt in response to user actions and feedback.

The task manipulation processor 112 communicates directly with the user 102. The task manipulation processor 112 receives user feedback, regarding suggestions made by the task assistance processor 106. As discussed above, this feedback may be used to adapt the manner in which suggestions are made to the user 102.

The task executor 124 receives task- and workflow-related suggestions from the task assistance processor 106 and cooperates with the instrumented applications 128 on the user's machine to carry out the suggestions. In particular, the task executor 124 provides the ability to perform tasks on behalf of or in conjunction with the user 102. For instance, the task assistance processor 106 may suggest that the user 102 email a certain person. The task executor 124 would then cooperate with the email application on the user's machine to send the suggested email.

Action taken by the task executor 124 is enabled by the shared workflow library 126, which is directly accessible by the task executor 124. In addition, the task executor 124 receives data from the workflow tracker 108.

Figure 2:
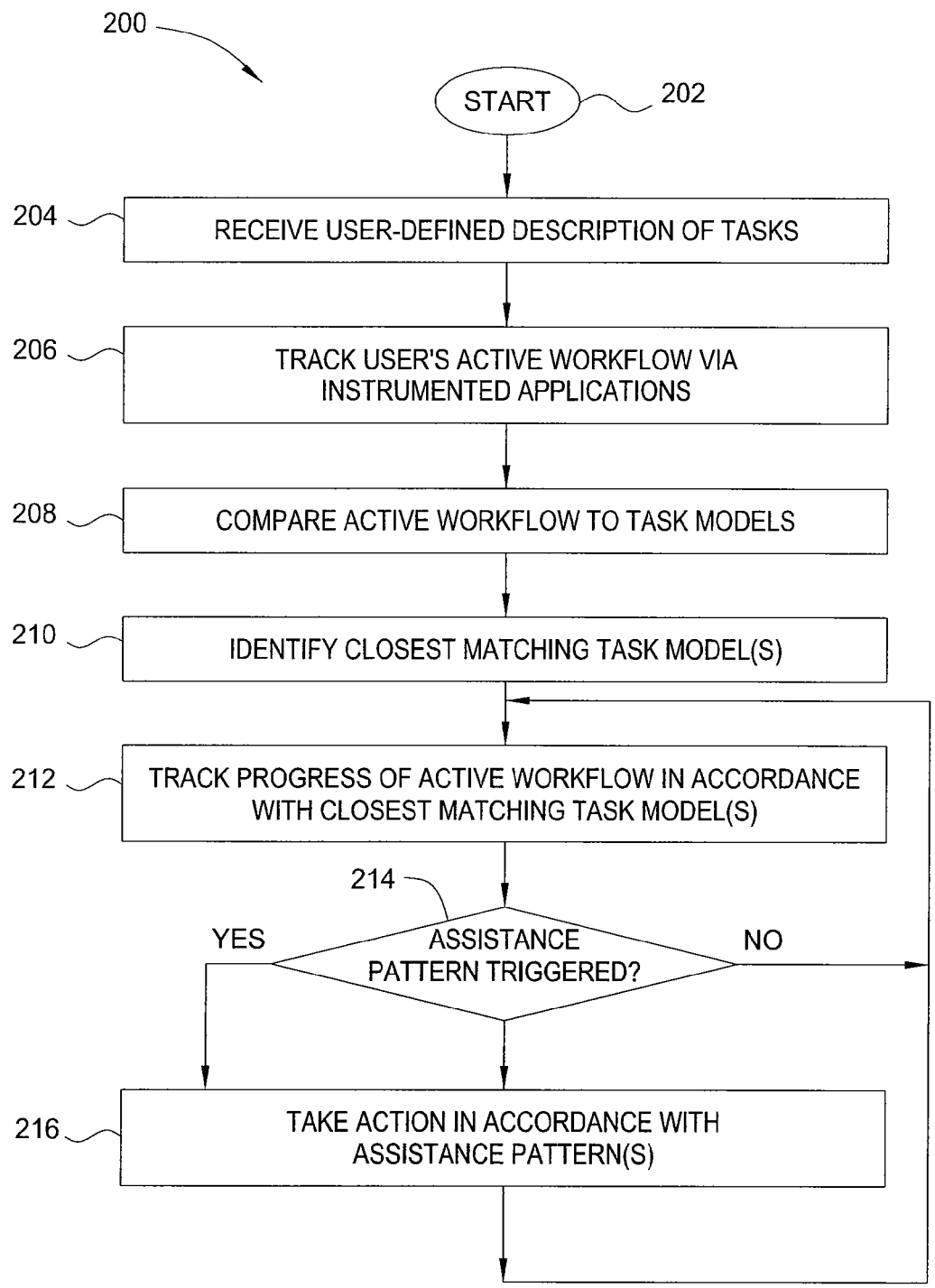
FIG. 2 is a flow diagram illustrating one embodiment of a method for making automated suggestions to a user in the context of an active workflow.

FIG. 2 is a flow diagram illustrating one embodiment of a method 200 for making automated suggestions to a user in the context of an active workflow. The method 200 may be implemented, for example, by the task manager 100 illustrated in FIG. 1. As such, reference will be made in the discussion of the method 200 to various components of the task manager 100. However, those skilled in the art will appreciate that the method 200 is not limited to execution in conjunction with the task manager configuration illustrated in FIG. 1.

The method 200 is initialized in step 202 and proceeds to optional step 204 (illustrated in phantom), where the task learner 122 receives a user-defined description of the tasks that the user 102 intends to accomplish. This description represents a concrete manifestation of the user's intent descending from one or more goals, thus obviating the need for the task manager 100 to infer the user's intent.

In step 206, the workflow tracker 108 tracks the user's active workflow via the instrumented applications 128. The workflow tracker 108 then compares this active workflow to the task models stored in the shared workflow library 126 in step 208, as discussed above.

In step 210, the workflow tracker 108 identifies one or more task models that most closely match the active workflow. For example, the workflow tracker may identify a single task model that matches the active workflow most closely, or may identify the N closest matching task models. The workflow tracker 108 then continues to track the progress of the active workflow in step 212, as discussed above, in accordance with the matching task model(s) identified in step 210.

In step 214, the task assistance processor 106 determines whether the current step of the active workflow triggers any of the assistance patterns 114. If the task assistance processor 106 concludes in step 214 that the current step of the active workflow does not trigger any of the assistance patterns 114, the method 200 returns to step 212, and the workflow tracker 108 continues to track the progress of the active workflow.

Alternatively, if the task assistance processor 106 concludes in step 214 that the current step of the active workflow does trigger at least one of the assistance patterns 114, the suggestion manager 110 takes some action in accordance with the triggered assistance pattern(s) in step 216. As discussed above, this action may comprise an autonomous action that is taken directly by the task manager 100, via the task executor 124. Alternatively, this action may comprise offering one or more suggested actions to the user, optionally followed by the task manager 100 taking one or more of the suggested actions pursuant to the user's approval. Once the task manager 100 has acted, the method 200 returns to step 212, and the workflow tracker 108 continues to track the progress of the active workflow.

Although FIG. 2 illustrates assistance patterns being triggered through the process of tracking workflow progress, in embodiments of the invention, the assistance patterns may also be triggered immediately upon initialization of the method 200, by user task descriptions (e.g., in accordance with step 204), or by other events.

As discussed above, embodiments of the invention are facilitated by the learning of workflows, which is performed by the task learner 122 of FIG. 1. Embodiments of the invention allow the task learner 122 to learn workflows from single or multiple user demonstrations, including user demonstrations in which dataflow (i.e., action sequences) may be incomplete. A workflow comprises a mix of demonstrated (i.e., directly observable) actions and hidden (i.e., not directly observable, such as mental) actions. Thus, a workflow is considered to be "incomplete" from the perspective of the task learner 122 if the workflow contains one or more hidden actions.

Within the context of the present invention, an "action" is defined by a set of input and output arguments such that $A(+i_1 \ldots +i_m - o_1 \ldots -o_n)$ denotes the action A with input arguments $\{i_1, \ldots, i_m\}$ and output arguments $\{o_1, \ldots, o_n\}$. An argument has an associated semantic type and may be scalar, a set, a list, or a tuple (i.e., a record or heterogeneous fixed-size list), any of which may be of arbitrary depth. A "demonstration" within this context comprises a sequence of actions with constant arguments. The dataflow paradigm requires that every input of every action is supported by at least one output of previous actions or by an input parameter.

Given a demonstration, embodiments of the invention generalize the demonstration into an executable procedure. In one embodiment, this involves two major operations: dataflow completion and generalization. As discussed in further detail below, dataflow completion involves identifying actions that are part of a dataflow but are not directly observable. Thus, in general, dataflow completion produces a set of viable completions.

The generalization step considers each viable dataflow completion in turn, halting when a valid generalization is discovered. Generalization of the completed dataflow involves parameter generalization and structural generalization. Parameter generalization involves finding the possible supports for an input and recording each support by a common variable or by a list/tuple expression or scalar expression over variables that unifies the supporting output(s) with the supported input. Structural generalization involves inducing looping structures over the action sequence. In addition, embodiments of the invention determine a task signature or set of inputs required by and the outputs generated by execution of the executable procedure.

Dataflow completion refers to the fact that, for a procedure to be executable, every input of every action must be supported. Because a demonstration may include actions that are not observable by the task learner 122 (e.g., mental operations performed by the user), the dataflow represented by the observed actions may be incomplete (i.e., certain inputs may be unsupported). The task learner 122 must in this case find additional actions that could support the unsupported inputs and thereby complete the dataflow.

In one embodiment, the task learner 122 completes a dataflow by inserting information-producing actions (e.g., information extractors, string manipulation operations, etc.) that will generate required inputs from known outputs. In one embodiment, the task learner 122 identifies these actions by running a depth-bounded forward search over the space of information-producing actions, which produces a plan for generating the required inputs.

In an alternative embodiment, the task learner 122 completes a dataflow through a knowledge base query that attempts to follow a relational path from known outputs to required inputs.

Figure 3:
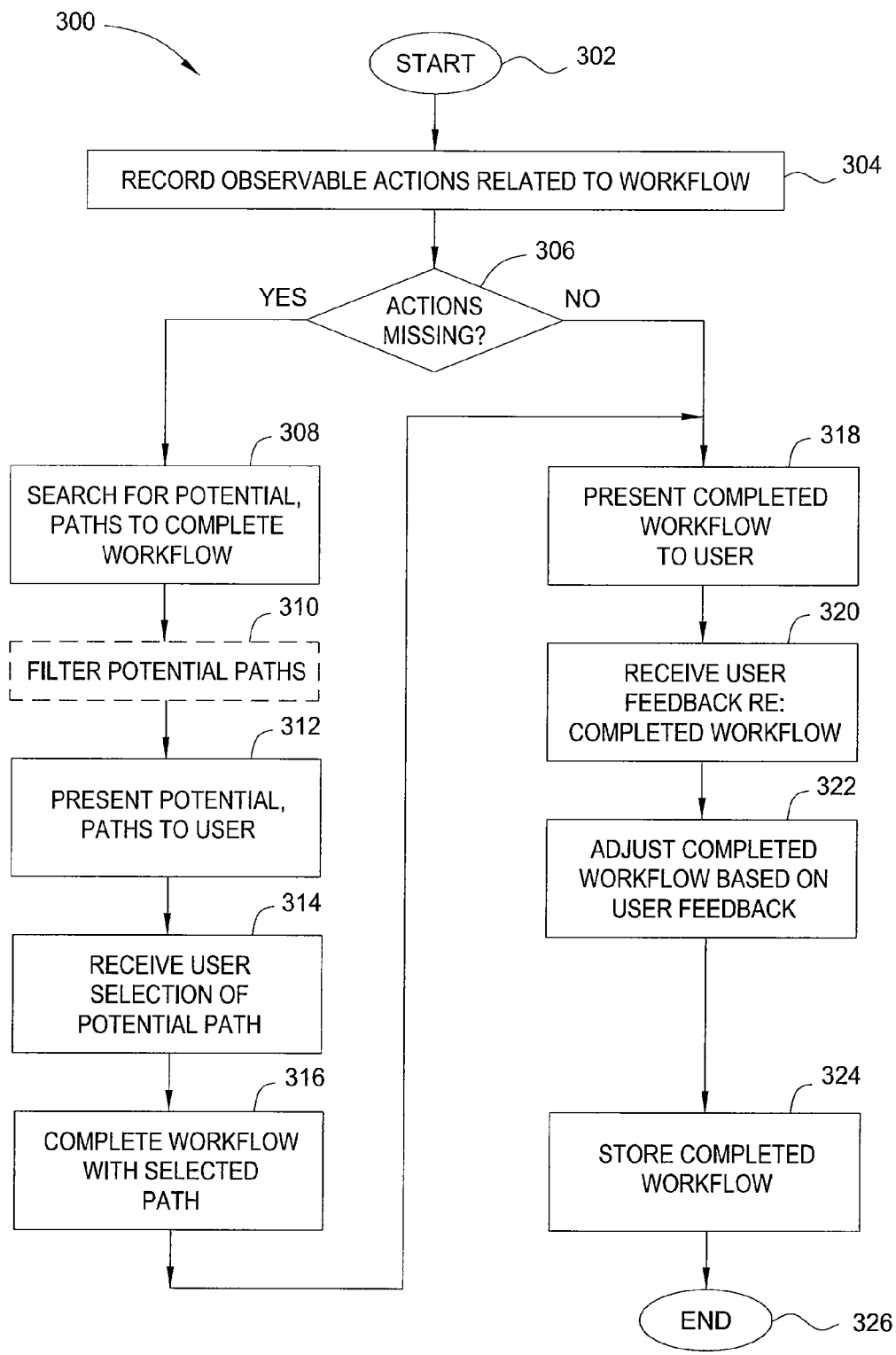
FIG. 3 is a flow diagram illustrating one embodiment of a method for learning a workflow, based on at least one user demonstration.

FIG. 3 is a flow diagram illustrating one embodiment of a method 300 for learning a workflow, based on at least one user demonstration. In particular, the method 300 learns a workflow by completing the associated dataflow via a knowledge base query, as discussed above. The method 300 may be implemented, for example, by the task learner 122 illustrated in FIG. 1. As such, reference will be made in the discussion of the method 300 to the task learner 122. However, those skilled in the art will appreciate that the method 300 is not limited to execution in conjunction with the task learner configuration illustrated in FIG. 1.

The method 300 is initialized at step 302 and proceeds to step 304, where the task learner 122 records observable actions (i.e., a user demonstration) related to a workflow. As discussed above with respect to FIG. 1, the task learner 122 may obtain data regarding these observable actions from instrumented applications 128 on the user's machine.

In step 306, the task learner 122 determined whether the workflow embodied in the observable actions is missing any actions. As discussed above, the workflow is "missing" an action (typically an unobservable action) if an input of an action in the workflow is not supported by at least one output of a previous action.

If the task learner 122 concludes in step 306 that the workflow is missing at least one action (i.e., the workflow is incomplete), the method 300 proceeds to step 308, where the task learner 122 searches for potential actions to complete the workflow. In one embodiment, the search queries a knowledge base that models relations among people and/or actions as one or more ontologies. Given an unsupported input for a particular action and a set of known outputs for a previous action, a query to knowledge base that relates any of the known outputs to the input will complete the workflow. Thus, in one embodiment, a query to the knowledge base includes at least three components or search parameters to guide the search: (1) a source object (e.g., one or more known outputs); (2) a target object (e.g., an unsupported input); and (3) a maximum search depth. The search results comprise a set of potential paths (e.g., within one of the ontologies) between the source object and the target object up to the maximum search depth. In one embodiment, the search results are ordered according to path length. Each path represents a set of one or more potential actions connecting the source object to the target object.

In optional step 310 (illustrated in phantom), the task learner 122 filters the set of potential paths identified in step 308 according to one or more criteria. In one embodiment, the potential paths are filtered according to number of targets. Intuitively, a path that connects the source object to fewer target objects is more informative than a path that connects the source object to more target objects. Thus, given the choice between two potential paths, the task learner 122 will discard the path that connects to source object to a greater number of target objects.

In another embodiment, the potential paths are filtered according to redundancy. Because the set of ontologies maintained by the knowledge base may include sub-ontologies, the knowledge base may include relations that are duplicates of each other. For example, within email threads, the "nextEmailInThread" relation is redundantly represented by the "next-element" relation. Thus, given two potential paths that differ only in sub-paths, where the sub-paths are equivalent, the task learner 122 will discard one of these paths.

In another embodiment, the potential paths are filtered according to repetition of sub-paths. Repetition of sub-paths may occur when the objects on each end of the sub-path are of the same type. This may be the case, for example, when searching for paths between two people who happened to have exchanged emails multiple times within a single thread. Since the basic relation captured by such a path is that of one person replying to an email sent by another person, the paths involving other emails exchanged in the thread are largely redundant. Thus, given a family of potential paths such that the paths differ only in how many occurrences of a repeatable sub-path they contain, the task learner 122 will retain only the minimal path containing exactly one occurrence of the repeatable sub-path.

In another embodiment, the potential paths are filtered according to the occurrence of subsumable paths. Due to the highly connected nature of the knowledgebase, there may be multiple paths connecting any two objects. Some of these paths may subsume other paths in the sense that the longer path can be seen as taking a detour before returning to the shorter path (for example, the path A-B-C subsumes the path A-C). Thus, given two paths where one of the paths subsumes the other, the task learner 122 will discard the path that does the subsuming.

In another embodiment, the potential paths are filtered according to commonalities. Since it is likely that members of a collection share a common rationale for being part of the collection used in an action, some embodiments of the invention prefer paths that complete the workflow for as many members of the collection as possible. Thus, given a collection of target objects that are individually supportable by a set of paths, the task learner 122 prefers the path that is a member of as many paths in the set as possible.

Referring back to FIG. 3, in step 312, the task learner 122 presents the set of potential paths, which have optionally been filtered, to the user for selection of the most appropriate path.

The task learner 122 receives the user selection in step 314, and in step 316 the task learner 122 completes the workflow with the selected path.

In step 318, the task learner 122 presents the completed workflow to the user. The task learner 122 then receives user feedback regarding the completed workflow in step 320. This user feedback may comprise, for example indications as to whether certain parameters of the actions in the completed workflow should be considered constants (e.g., "always use this") or variables (e.g., "ask me for this"), or whether the parameters should be generated at runtime by a previous action (e.g., "deduce value"). The user may also choose to provide additional inputs, such as added variables.

In step 322, the task learner adjusts the completed workflow in accordance with the user feedback received in step 324. The task learner 122 than stores the completed workflow (e.g., as a task model in the shared workflow library 126) in step 324 before the method 300 terminates in step 326.

Referring back to step 306, if the task learner concludes in step 306 that the workflow is complete (i.e., no actions are missing), the method 300 proceeds directly to step 318 and proceeds as discussed above to finalize the completed workflow.

As discussed above with respect to FIG. 1, in some embodiments, the task learner 122 additionally learns through mixed-initiative or active learning. As also discussed above, one embodiment of this mixed-initiative learning involves posing questions to the user 102 in order to clarify the inferences that the task learner has drawn from observing user demonstrations. The question-asking process may be divided into at least three sub-processes: (1) question nomination (i.e., generating questions that can potentially provide value to the learning process); (2) question selection (i.e., choosing from among nominated questions those that should be posed to the user 102); and (3) question posing (i.e., interactions with the user 102 to obtain answers).

The second of these sub-processes, question selection, balances the need for information to further the learning process with the following considerations: (1) individual questions contribute different levels of value to the learning process; (2) answering questions imposes a burden on the user; and (3) the role of question asking is to inform learning, rather than to replace it by a knowledge acquisition process. As alluded to above, these considerations naturally lead to the formulation of the question selection problem in terms of a cost-benefit analysis, drawing on models of utility and cost for individual questions.

The base utility of a question is determined by the learning component that nominates the question. The factors that affect base utility are highly dependent on the specifics of the nominating component. For example, learning components might measure utility in terms of the expected change in the theoretical lower bound on the number of demonstrations needed to learn the target workflow. Learning components faced with ambiguity might factor in the expected reduction in the number of valid alternative hypotheses.

Thus, in one embodiment, the present invention considers factors beyond base utility in determining overall question utility. First, base utility estimates are normalized to make them comparable across learning components. Second, the relative importance of contributions from different learning components is considered. Finally, multiple learning components may benefit from the answer to a given question.

Given these considerations, the utility of a question for an individual learning component is defined to be the weighted sum of the base utility assigned by that learning component and the utility of the associated learning goal that motivated the question by the learning component. The overall utility for the question is the weighted sum of the utilities assigned by the individual learning components.

In one embodiment, one main cost factor is also considered in determining whether to interact with a user by posing questions. This factor comprises the inherent difficulty of the question. With this perspective, the cost model measures the cognitive burden incurred in answering the question. In one embodiment, the cost of a question is the weighted sum of the cost associated with the format of the question (e.g., multiple choice, open ended, etc.) and the groundedness cost of the question (i.e., whether the question relates to concrete elements in the demonstration or a hypothetical situation).

In one embodiment, the questions that the task learner 122 poses to the user 102 fall into at least one of six categories: (1) workflow function and causality (i.e., seeking to identify the specific function of elements of the demonstration and relations among them, as a way of understanding the causal structure of the demonstration); (2) decision alternatives and justification (i.e., seeking to clarify why certain decisions were made and what alternatives are possible); (3) limitations and failure (i.e., seeking to understand limitations on the viability and desirability of the given demonstration, as well as causes and possible solutions to failures that result when workflows are executed); (4) request for demonstration (i.e., seeking additional demonstrations that focus on localized pieces of problem-solving knowledge, or to explore cases that will broaden system problem-solving knowledge); (5) abstraction (i.e., seeking information about the generalization of the demonstration into higher-level constructs such as iterations and generalized methods); (6) and meta-questions (i.e., seeking to focus on how to learn, rather than the domain-level knowledge being learned. FIGS. 4A-4B illustrate a table containing a plurality of exemplary questions falling into each of these categories.

As discussed above, the task learner 122 can also learn iterations or repeated sequences of actions over a collection of items. These repeated sequences of actions may be referred to as "loops," where the loop body generalizes the sequences. As discussed in further detail below, one embodiment of a method for learning loops from demonstrations comprises two main, mutually recursive phases: linear generation and loop generation. The linear generation phase takes an index into the demonstration and a multimap of known supports (where the multimap maps data values to supports) and generates a set of generalized programs that is consistent with the demonstration suffix starting from the index, and using the supports in the multimap. A program is consistent with a demonstration if the demonstration can be produced by executing the program under the assumption that each action, when executed in the same context (i.e., with the same previous actions having taken place) and with the same inputs as an occurrence in the demonstration will generate the same output as seen in that occurrence. The loop generation phase takes an index into the demonstration and the multimap together with a loop body length (b) and a number (n) of iterations and generates a set of generalized programs that are consistent with the demonstration suffix starting from the index and using the supports in the multimap, where the next $b \times n$ actions are explained by a loop over one or more lists of length n that has a loop body length of b.

Figure 5:
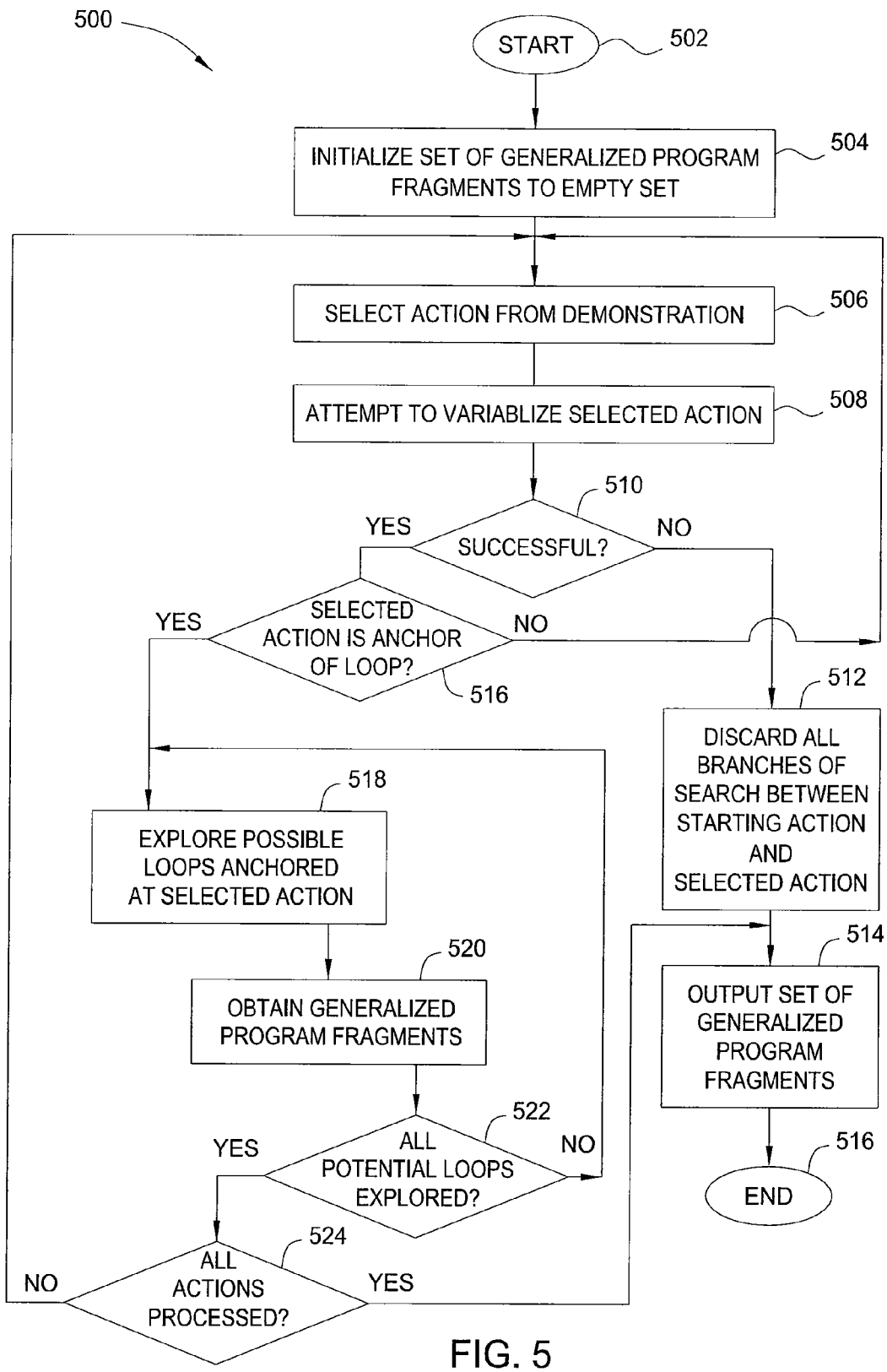
FIG. 5 is a flow diagram illustrating one embodiment of a method for linear generation, according to the present invention.

FIG. 5 is a flow diagram illustrating one embodiment of a method 500 for linear generation, according to the present invention. As described above, the method 500 may be implemented as the first phase of a method for learning a workflow from a demonstration that comprises one or more loops. Thus, the method 500 may be implemented, for example, by the task learner 122 illustrated in FIG. 1. As such, reference will be made in the discussion of the method 500 to the task learner 122. However, those skilled in the art will appreciate that the method 500 is not limited to execution in conjunction with the task learner configuration illustrated in FIG. 1.

The method 500 is initialized at step 502 and proceeds to step 504, where the task learner 122 initializes a set G of generalized program fragments to an empty set. In addition, an index in the demonstration is initialized to a demonstration starting point i (e.g., zero) and the multimap M is initialized as an empty map.

In step 506, the task learner 122 selects an action α from the demonstration. Actions are selected in the order in which they are demonstrated. Thus, the first action α selected by the task learner 122 is the action corresponding to the demonstration starting point index i. The method 500 then proceeds to step 508, where the task learner 122 attempts to variablize the selected action α. In creating a program action from a demonstration action, each output value u is replaced with a fresh variable, which is then added to the multimap M as a support for the value u used as an input in later actions. If the output value u is a list, the output variable is also recorded as a support for the first and last elements of the list. If the output value u is a tuple, the output variable is also recorded as a support for each element of the tuple.

Each input value v is replaced by a set of support expressions, which is computed recursively. The set S of support expressions s for an input value v is the union of the sets of support expressions for each support s that has the input variable v in the multimap M.

In the base case, a support s is a variable, and the resulting set S of support expressions is the singleton set containing just the support s itself. If the support s is a container c that contains the input value v, the set S of support expressions for the container c and for each support expression s in the set S of support expressions is computed recursively. A new expression using f(e), where e represents the support expression, is generated, where the function f is the appropriate accessor function for obtaining the input variable v from the container c. When an input value v to a demonstration action α has no supports, the attempt to variablize the demonstration action α fails. If variablization for a selected action fails, then all branches of search that require linear code from the demonstration starting point index i up to and including the current index are dead.

Thus, referring back to FIG. 5, the task learner 122 determines in step 510 whether the attempt to variablize the selected action α was successful. If the task learner concludes in step 510 that the attempted variablization failed, the method 500 proceeds to step 512, where the task learner 122 discards all branches of search that require linear code from the demonstration starting point index i up to and including the current index. The task learner 122 then outputs the set of generalized program fragments accumulated so far in step 514 before the method 500 terminates in step 516.

Alternatively, if the task learner concludes in step 510 that variablization was successful, the method 500 proceeds to step 516, where the task learner 122 determines whether the selected action α is the anchor of a loop. In variablizing an action, every time a support expression e is formed for an input value v, there is the possibility that instead of accessing the input value v using the "head" operation, the action α could be the first action that accesses the loop variable in a loop that iterates over the list l given by the support expression e. In such a case, the action α is referred to as the "anchor" of the loop. In one embodiment, the length of a list l that supports the input variable v is inserted into a set of iteration counts for loops anchored by the selected action α.

If the task learner 122 concludes in step 516 that the selected action α is not an anchor, the method 500 returns to step 506, and the task learner selects a next action α from the demonstration, where actions are selected in order. The method 500 then proceeds as described above.

Alternatively, if the task learner 122 concludes in step 516 that the selected action α is an anchor, the method 500 proceeds to step 518, where the task learner 122 explores the possible loops anchored at the selected action α. To detect potential loops anchored at the selected action α, each iteration count n in the set of iteration counts is considered in turn, and alternatives are attempted for loop body length b, and loop body start indices j. The linear generator phase looks for pairs of loop body lengths b and loop body start indices j where the sequence of action names in the demonstration fragment that corresponds to the first iteration is equal to the sequence of action names in the demonstration fragments for each iteration that corresponds to the subsequent n−1 iterations. Such a pair of loop body length b and loop body start index j described a potential list loop of n iterations, where n corresponds to the iteration count as described above.

Figure 6:
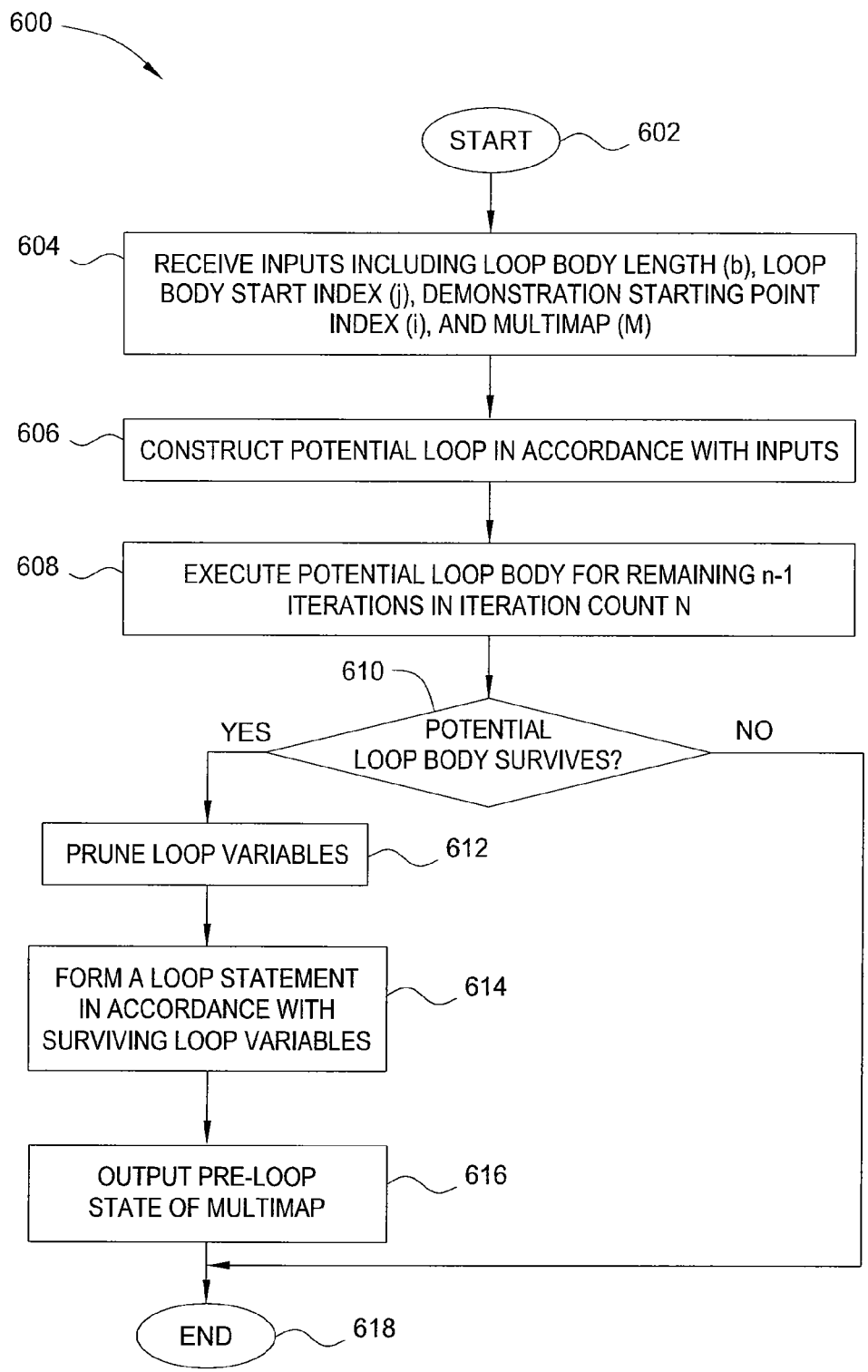
FIG. 6 is a flow diagram illustrating one embodiment of a method for loop generation, according to the present invention

For each pair of loop body length b and loop body start index j that is detected in step 518, the task learner processes the pair in accordance with the loop generation phase, described in greater detail with respect to FIG. 6. The inputs to this phase are the loop body length b, the loop body start index j, the iteration count n, and the state of the multimap M just before variablization of the selected action α at the loop body start index j.

The task learner 122 obtains generalized program fragments from the loop generation phase in step 520. The generalized program fragments are grafted on to the current generalized program fragment for all actions up to but not including the action corresponding to the loop body start index j.

In step 522, the task learner 122 determines whether there are any potential loops anchored at the selected action α that remain to be explored. If the task learner 122 concludes in step 522 that there are more potential loops to explore, the method 500 returns to step 518, and the task learner 122 explores the next potential loop as discussed above.

Alternatively, if the task learner 122 concludes in step 522 that there are no more potential loops to explore, the task learner determines in step 524 whether there are any actions a in the demonstration that have not been processed. If the task learner 122 concludes in step 524 that there are actions remaining to be processed, the method 500 returns to step 506 and selects the next action, as discussed above.

Alternatively, if the task learner 122 concludes in step 524 that no actions remain to be processed, the task learner proceeds to step 514 and outputs the set of generalized program fragments received in step 520. In one embodiment, the resulting generalized program fragments are output to the set G of generalized program fragments that was initialized in step 504. Thus, the set G of generalized program fragments now represents the set of generalized program fragments accumulated so far.

Given a pair of loop body length b and loop body start index j, the loop generation phase attempts to generate a loop with the given loop body length b that iterates over one or more lists of length n, starting with the action α corresponding to the demonstration starting point index i and using supports from the multimap M. In one embodiment, this is accomplished in two phases.

FIG. 6 is a flow diagram illustrating one embodiment of a method 600 for loop generation, according to the present invention. As described above, the method 600 may be implemented as the second phase of a method for learning a workflow from a demonstration that comprises one or more loops. Thus, the method 600 may be implemented, for example, by the task learner 122 illustrated in FIG. 1. As such, reference will be made in the discussion of the method 600 to the task learner 122. However, those skilled in the art will appreciate that the method 600 is not limited to execution in conjunction with the task learner configuration illustrated in FIG. 1.

The method 600 is initialized at step 602 and proceeds to step 604, where the task learner 122 receives a plurality of input including a loop body length b, a loop body start index j, the demonstration starting point index i, and the multimap M.

In step 606, the task learner 122 constructs a potential loop in accordance with the inputs received in step 604. In one embodiment, the potential loop is constructed by variablizing the first b actions starting at the demonstration starting point index i. Finding supports for inputs, variablizing outputs, and adding supports to the multimap M works in a manner similar to that described above in connection with the linear generation phase (i.e., FIG. 5). Because supports will be local to this iteration of the loop, a reference to the original state of the multimap M is kept for use after the end of the loop. Each input value v that is supported as the first element of length n causes the list l to be recorded as a potential list to be looped over, and a loop variable is created for the input value v. This loop variable then becomes an alternative support for the input variable.

In step 608, the task learner 122 executes the potential loop body for the remaining n−1 iterations in the iteration count n. In one embodiment, execution of the potential loop body in this manner involves pruning inconsistent support expressions e for input values v.

In one embodiment, variables are bound to values at the start of each of the n−1 iterations. Each loop variable receives its value from the list l that the loop variable is iterating over. Each action α in the potential loop body is then compared to the corresponding action α for the current iteration in the demonstration. Alternative support expressions e for input values v in the potential loop body whose evaluations disagree with the actual values found in the demonstration are pruned. If an input value v loses all of its support expressions e, a failure occurs, and an empty set of generalized program fragments is output. Output values u from the demonstration are used to update the value bindings for this iteration. In addition, each output value u occurring in the potential loop body is potentially a list l that is generated by the loop and is accumulated in a fresh variable for later use.

In step 610, the task learner 122 determines whether the potential loop body survives the n−1 iterations. If the task learner 122 concludes in step 608 that the potential loop body does not survive the n−1 iterations, then there is a failure and the method 600 terminates in step 616.

Alternatively, if the task learner 122 concludes in step 610 that the potential loop body survives the n−1 iterations, the method 600 proceeds to step 612, where the task learner 122 prunes the loop variables. In one embodiment, the task learner 122 checks the loop variables, and any loop variables that no longer appear in a support expression e for some action input value v are pruned. If all of the loop variables are pruned, then there is a failure.

In step 614, the task learner 122 forms a loop statement in accordance with the surviving (unpruned) loop variables. In one embodiment, the loop statement is formed with the surviving loop variables iterating over their lists, using the pruned body.

In step 616, the task learner 122 outputs (e.g., to the linear generator phase) the pre-loop state of the multimap M, so that a set of generalized program fragments can be grafted onto the end of the newly constructed loop as described above. The method 600 then terminates in step 618.

Figure 7:
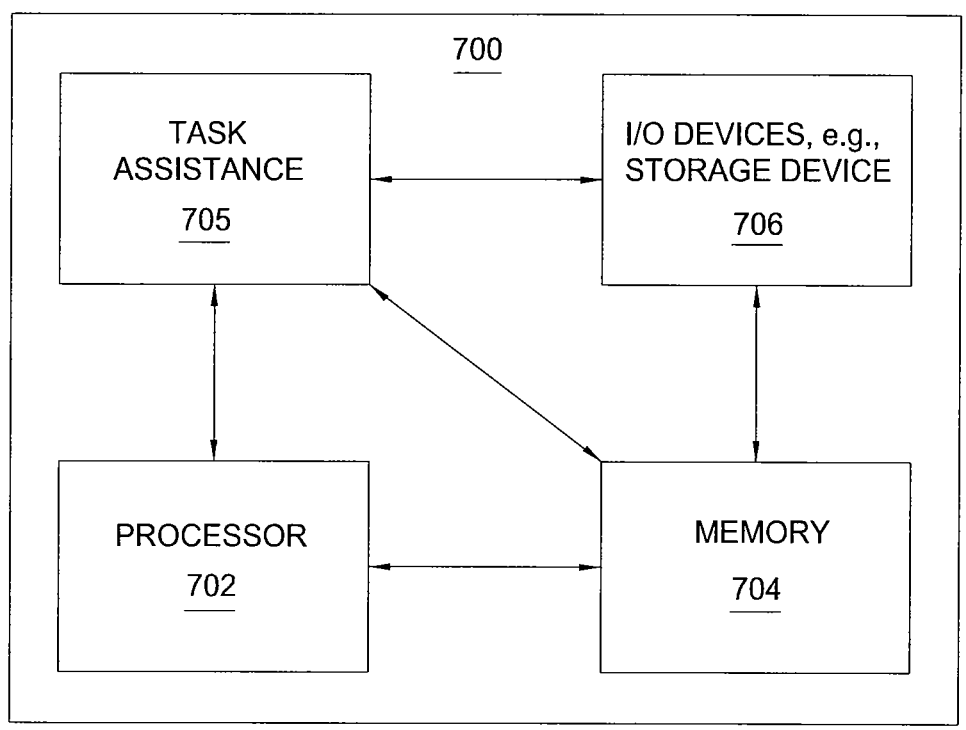
FIG. 7 is a high level block diagram of the present invention implemented using a general purpose computing device.

FIG. 7 is a high level block diagram of the present invention implemented using a general purpose computing device 700. It should be understood that embodiments of the invention can be implemented as a physical device or subsystem that is coupled to a processor through a communication channel. Therefore, in one embodiment, a general purpose computing device 700 comprises a processor 702, a memory 704, a task assistance module 705, and various input/output (I/O) devices 706 such as a display, a keyboard, a mouse, a modem, and the like. In one embodiment, at least one I/O device is a storage device (e.g., a disk drive, an optical disk drive, a floppy disk drive).

Alternatively, embodiments of the present invention (e.g., task assistance module 705) can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the task assistance module 705 for assisting a user in the execution of individual and shared tasks described herein with reference to the preceding Figures can be stored on a computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for assisting a user in an execution of a task, where the task comprises one or more workflows required to accomplish a goal defined by the user, the method comprising:

identifying, using a workflow tracker, a current workflow executing on a machine used by the user, where the current workflow is one of the one or more workflows and wherein the identifying is performed automatically by the machine in an absence of a manual identification of the current workflow by matching data related to the current workflow to a stored task model, wherein the identifying comprises:

receiving, from one or more instrumented applications executing on the machine used by the user, the data related to the current workflow; and identifying the stored task model in a workflow library as one of a plurality of task models that most closely matches the current workflow, based on the data, wherein the stored task model encodes a set of workflows for accomplishing a corresponding task;

tracking, using the workflow tracker, a progress of the current workflow in accordance with the stored task model, wherein the stored task model comprises a variablized version of a previous workflow that is customized during the execution for the current workflow;

generating a suggestion based on the progress of the current workflow and on the stored task model, where the suggestion assists the user in progressing toward a completion of the task;

manipulating an application on the machine used by the user to carry out the suggestion; and learning the stored task model from a user demonstration, wherein the learning comprises:

recording an action sequence that embodies a dataflow, in accordance with the user demonstration, wherein the action sequence comprises one or more observed actions executed on the machine used by the user; and inserting at least one inferred action into the dataflow, wherein the at least one inferred action is inserted in a gap between a first one of the one or more observed actions and a second one of the one or more observed actions, and wherein the at least one inferred action is not one of the one or more observed actions, wherein at least one of: the workflow tracking, the generating, or the manipulating is performed using a processor.

2. The method of claim 1, wherein the at least one inferred action produces an output to support an input required by the second one of the one or more observed actions, and wherein the input is not supported by a previous one of the one or more observed actions.

3. The method of claim 1, wherein the inserting comprises:
querying a knowledge base for one or more potential paths that bridge the gap, wherein each of the one or more potential paths comprises one or more actions;
presenting the one or more potential paths to the user;
receiving a selection of one of the one or more potential paths from the user, wherein the one of the one or more potential paths comprises the at least one inferred action; and
completing the dataflow in accordance with the one of the one or more potential paths.

4. The method of claim 3, further comprising:
filtering the one or more potential paths in accordance with one or more criteria, prior to presenting the one or more potential paths to the user.

5. The method of claim 4, wherein the one or more criteria comprises at least one of: a number of inputs or outputs to which each of the one or more potential paths is connected, a redundancy of the one or more potential paths, a repetition of sub-paths within the one or more potential paths, an occurrence of subsumable paths within the one or more potential paths, or commonalties among the one or more potential paths.

6. The method of claim 3, further comprising:
presenting the dataflow, as completed, to the user;
receiving user feedback regarding the dataflow, as completed;
adjusting the dataflow based on the user feedback; and
storing the dataflow as a task model in the workflow library.

7. The method of claim 6, wherein the user feedback comprises an answer to a question.

8. The method of claim 1, wherein the tracking comprises:
identifying a step of the stored task model that corresponds to a current step of the current workflow; and
following the progress of the current workflow in accordance with the set of workflows encoded in the stored task model, starting from the step of the stored task model.

9. The method of claim 8, wherein the generating comprises:
determining when the current workflow satisfies a trigger condition of an assistance pattern;
identifying an action corresponding to the trigger condition; and
forming the suggestion, wherein the suggestion suggests executing the action.

10. The method of claim 9, wherein the manipulating comprises:
executing the action.

11. The method of claim 10, wherein the manipulating further comprises:
transmitting the suggestion to the user; and
waiting for approval of the suggestion by the user before executing the action.

12. The method of claim 1, wherein the tracking comprises representing the current workflow as a Logical Hidden Markov Model.

13. A method for assisting a user in an execution of a task, where the task comprises one or more workflows required to accomplish a goal defined by the user, the method comprising:

identifying, using a workflow tracker, a current workflow executing on a machine used by the user, where the current workflow is one of the one or more workflows and wherein the identifying is performed automatically by the machine in an absence of a manual identification of the current workflow by matching data related to the current workflow to a stored task model, wherein the identifying comprises:

receiving, from one or more instrumented applications executing on the machine used by the user, the data related to the current workflow; and identifying the stored task model in a workflow library as one of a plurality of task models that most closely matches the current workflow, based on the data, wherein the stored task model encodes a set of workflows for accomplishing a corresponding task;

tracking, using the workflow tracker, a progress of the current workflow in accordance with the stored task model, wherein the stored task model comprises a variablized version of a previous workflow that is customized during the execution for the current workflow;

generating a suggestion based on the progress of the current workflow and on the stored task model, where the suggestion assists the user in progressing toward a completion of the task;

manipulating an application on the machine used by the user to carry out the suggestion; and learning the stored task model from a user demonstration, wherein the learning comprises:

discovering a loop in the user demonstration previous workflow, wherein the user demonstration previous workflow comprises a plurality of actions, and wherein the loop comprises at least one repeated sequence of actions occurring in the plurality of actions, wherein at least one of: the workflow tracking, the generating, or the manipulating is performed using a processor.

14. The method of claim 13, wherein the discovering comprises, for each action in the plurality of actions:
   variablizing the action;
   exploring at least one loop anchored at the action; and
   deriving a set of one or more generalized program fragments from the at least one loop.

15. The method of claim 14, further comprising:
   grafting the set of one or more generalized program fragments onto a current generalized program fragment for all of the plurality of actions up to, but not including, an action corresponding to an index into the user demonstration that is associated with a start of the body of the at least one loop.

16. The method of claim 14, wherein the exploring comprises:
   receiving a plurality of inputs, wherein the plurality of inputs comprises: a length of a body of the at least one loop, an index into the user demonstration that is associated with a start of the body of the at least one loop, a starting point index into the user demonstration, and a multimap that that maps one or more data values to one or more supports for the action;
   constructing the at least one loop in accordance with the plurality of inputs;
   executing the at least one loop for a plurality of iterations, wherein a number of the plurality of iterations is one less than a current iteration count; and
   forming a loop statement in accordance with variables contained in the at least one loop.

17. The method of claim 13, wherein the loop loops over at least one collection of objects.

18. The method of claim 17, wherein the at least one collection of objects comprises one unordered collection of objects or one or more ordered collections of objects.

19. The method of claim 17, wherein the loop outputs an ordered collection of objects.

20. The method of claim 13, wherein the tracking comprises representing the current workflow as a Logical Hidden Markov Model.

21. The method of claim 13, wherein the tracking comprises:
   identifying a step of the stored task model that corresponds to a current step of the current workflow; and
   following the progress of the current workflow in accordance with the set of workflows encoded in the stored task model, starting from the step of the stored task model.

22. The method of claim 21, wherein the generating comprises:
   determining when the current workflow satisfies a trigger condition of an assistance pattern;
   identifying an action corresponding to the trigger condition; and
   forming the suggestion, wherein the suggestion suggests executing the action.

23. The method of claim 22, wherein the manipulating comprises:
   executing the action.

24. The method of claim 23, wherein the manipulating further comprises:
   transmitting the suggestion to the user; and
   waiting for approval of the suggestion by the user before executing the action.

25. A computer readable storage medium containing an executable program for assisting a user in an execution of a task, where the task comprises one or more workflows required to accomplish a goal defined by the user, where the program performs steps of:
   identifying, using a workflow tracker, a current workflow executing on a machine used by the user, where the current workflow is one of the one or more workflows and wherein the identifying is performed automatically by the machine in an absence of a manual identification of the current workflow by matching data related to the current workflow to a stored task model, wherein the identifying comprises:
      receiving, from one or more instrumented applications executing on the machine used by the user, the data related to the current workflow; and
      identifying the stored task model in a workflow library as one of a plurality of task models that most closely matches the current workflow, based on the data, wherein the stored task model encodes a set of workflows for accomplishing a corresponding task;
   tracking, using the workflow tracker, a progress of the current workflow in accordance with the stored task model, wherein the stored task model comprises a variablized version of a previous workflow that is customized during the execution for the current workflow;
   generating a suggestion based on the progress of the current workflow and on the task model, where the suggestion assists the user in progressing toward a completion of the task;
   manipulating an application on the machine used by the user to carry out the suggestion; and
   learning the stored task model from a user demonstration, wherein the learning comprises:
      recording an action sequence that embodies a dataflow, in accordance with the user demonstration, wherein the action sequence comprises one or more observed actions executed on the machine used by the user; and
      inserting at least one inferred action into the dataflow, wherein the at least one inferred action is inserted in a gap between a first one of the one or more observed actions and a second one of the one or more observed actions, and wherein the at least one inferred action is not one of the one or more observed actions.

26. A computer readable storage medium containing an executable program for assisting a user in an execution of a task, where the task comprises one or more workflows required to accomplish a goal defined by the user, where the program performs steps of:
   identifying, using a workflow tracker, a current workflow executing on a machine used by the user, where the current workflow is one of the one or more workflows and wherein the identifying is performed automatically by the machine in an absence of a manual identification of the current workflow by matching data related to the current workflow to a stored task model, wherein the identifying comprises:
      receiving, from one or more instrumented applications executing on the machine used by the user, the data related to the current workflow; and
      identifying the stored task model in a workflow library as one of a plurality of task models that most closely matches the current workflow, based on the data, wherein the stored task model encodes a set of workflows for accomplishing a corresponding task;
   tracking, using the workflow tracker, a progress of the current workflow in accordance with the stored task model, wherein the stored task model comprises a variablized version of a previous workflow that is customized during the execution for the current workflow;

generating a suggestion based on the progress of the current workflow and on the task model, where the suggestion assists the user in progressing toward a completion of the task;

manipulating an application on the machine used by the user to carry out the suggestion; and learning the stored task model from a user demonstration, wherein the learning comprises:

discovering a loop in the user demonstration previous workflow, wherein the user demonstration previous workflow comprises a plurality of actions, and wherein the loop comprises at least one repeated sequence of actions occurring in the plurality of actions.

* * * * *